United States Patent
Gilligan et al.

(10) Patent No.: US 10,614,095 B2
(45) Date of Patent: *Apr. 7, 2020

(54) METHOD AND SYSTEMS FOR MONITORING CHANGES FOR A SERVER SYSTEM

(71) Applicant: MASTERCARD INTERNATIONAL INCORPORATED, Purchase, NY (US)

(72) Inventors: Robert Gilligan, Dublin (IE); Glen Bollard, Dublin (IE); Grace Sutton, Wicklow (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/618,032

(22) Filed: Jun. 8, 2017

(65) Prior Publication Data
US 2017/0357704 A1  Dec. 14, 2017

(30) Foreign Application Priority Data

Jun. 9, 2016  (EP) ..................................... 16173816

(51) Int. Cl.
*G06F 16/27* (2019.01)
*G06F 16/23* (2019.01)
*G06F 11/30* (2006.01)
*H04L 12/26* (2006.01)

(52) U.S. Cl.
CPC .......... *G06F 16/27* (2019.01); *G06F 11/3051* (2013.01); *G06F 11/3065* (2013.01); *G06F 16/2358* (2019.01); *H04L 43/08* (2013.01); *G06F 11/3055* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,203,881 B1 | 4/2007 | Williams et al. | |
| 7,676,510 B1 | 3/2010 | Karinta | |
| 7,818,299 B1 * | 10/2010 | Federwisch | G06F 11/2066 707/649 |
| 8,370,303 B1 * | 2/2013 | Ceschim | G06F 16/219 707/640 |
| 9,524,389 B1 * | 12/2016 | Roth | G06F 21/554 |

(Continued)

*Primary Examiner* — Richard L Bowen
(74) *Attorney, Agent, or Firm* — Harness, Dickey & Pierce, P.L.C.

(57) ABSTRACT

A method and systems for monitoring changes for a server system are disclosed. The server system is operated on a first hardware system. Data is duplicated from the server system, and the data duplicated from the server system is transferred from the first hardware system on which the server system is operated, to a second hardware system separate from the first hardware system. The duplicated data is then processed on the second hardware system to determine a change for the server system. Present duplicated data transferred to the second hardware system may be compared to hosted data on the second hardware system, such as data previously duplicated from the server system. The server system may be a database server system.

11 Claims, 5 Drawing Sheets

(56) References Cited

U.S. PATENT DOCUMENTS

| | | |
|---|---|---|
| 9,792,371 B1* | 10/2017 | Mengle ................ G06F 16/9535 |
| 2003/0005109 A1 | 1/2003 | Kambhammettu et al. |
| 2003/0051188 A1 | 3/2003 | Patil |
| 2005/0086246 A1 | 4/2005 | Wood et al. |
| 2005/0132346 A1* | 6/2005 | Tsantilis ..................... G06F 8/71 |
| | | 717/168 |
| 2008/0114718 A1 | 5/2008 | Anderson et al. |
| 2014/0149354 A1* | 5/2014 | Chan ....................... G06F 9/455 |
| | | 707/639 |
| 2015/0081994 A1* | 3/2015 | Christopher ........ G06F 11/1458 |
| | | 711/162 |
| 2015/0149411 A1 | 5/2015 | Plisko et al. |
| 2015/0244599 A1* | 8/2015 | Nagai ................. G06F 11/0727 |
| | | 709/223 |
| 2015/0347286 A1 | 12/2015 | Kruglick |
| 2016/0266924 A1 | 9/2016 | Iyobe |
| 2016/0306627 A1* | 10/2016 | Hewitt ..................... G06F 8/33 |
| 2016/0364279 A1* | 12/2016 | Brew .................... G06F 11/079 |
| 2017/0103223 A1 | 4/2017 | Deulgaonkar et al. |
| 2017/0155549 A1* | 6/2017 | Bouz .................... H04L 41/147 |

* cited by examiner

METHOD AND SYSTEMS FOR MONITORING CHANGES FOR A SERVER SYSTEM

CROSS-REFERENCE TO RELATED APPLICATION

This application claims the benefit of and priority to European Patent Application No. 16173816.6, filed Jun. 9, 2016. The entire disclosure of the above application is incorporated herein by reference.

FIELD

This disclosure is directed to methods and systems for monitoring changes for a server system, such as a database server system.

BACKGROUND

This section provides background information related to the present disclosure which is not necessarily prior art.

Generic database systems and server systems are well known to the art. Generally, such systems include at least one database server machine hosting database information or data, and usually a database management system.

Such database systems are often dynamic, in that the data held by the database and/or the database management system are regularly updated with new information or data, or with rearrangement, reformatting, removal or the like of existing information. Such systems are also subject to possible errors or inconsistencies in the data held.

Certain basic monitoring systems for database systems are known. For example, a previously considered system may comprise software loaded on the database server, in addition to the database and database management system. Such systems are typically passive, in that they are usually only active when a problem occurs in the database, which triggers the monitoring system. They may also affect the database, as resources for running the monitoring software may be shared on the server with those required for running the database. They may even affect the database by interfering with data of the database itself, in order to carry out a monitoring action, whilst the database is being run, potentially slowing data processing. For this reason, other types of monitoring system may be prevented from assessing or monitoring any data beyond a certain level in the database or the management system, in order to prevent such effects. Previously considered systems are usually also simplistic, in that they only monitor the database for certain types of problems or changes.

The present disclosure aims to address these problems and provide improvements upon the known devices and methods.

SUMMARY

This section provides a general summary of the disclosure, and is not a comprehensive disclosure of its full scope or all of its features. Aspects and embodiments of the disclosure are set out in the accompanying claims.

In general terms, one embodiment of a first aspect of the disclosure can provide a method of monitoring changes for a server system, wherein the server system is operated on a first hardware system, the method comprising: duplicating data from the server system; transferring the data duplicated from the server system from the first hardware system on which the server system is operated, to a second hardware system separate from the first hardware system; and processing the duplicated data on the second hardware system to determine a change for the server system.

This removal of the monitoring process to a separate system allows the monitoring of the server system to be carried out away from the server system itself, so that the server system is not disturbed or interfered with during the monitoring process. This also means that local resources are not being used for the monitoring process. The method may be applicable to a data store, data system or database housed on the server, or to a database server. The duplication of the data for removal means that much more detailed and more comprehensive analysis can be carried out on the data, as the data is no longer housed by the server/database and can therefore be more freely examined and interfered with. This can also allow more intensive and more frequent analysis of the data, and allows the possibility of more active and "always-on" analysis of the data, as the local data is not disturbed.

The server system may be a database server system, such as those known to the art. The change determined, for the server system, may be any alteration, modification, variance, discrepancy, difference, divergence or the like in the data, or relating to the data of the server system. For example, a change in a data object, such as a table of the database, may be found in the processing or analysis of the data.

The server system is operated on, hosted by, run on (or operable to be run on), managed on, installed on, or located on the first hardware system. The second hardware system to which the duplicated or copied data is transferred or transmitted is separate, independent, disassociated or remote from the first hardware system; this may be a physical or distance separation, for example the two systems being connected by a network.

Preferably, the step of processing comprises comparing present duplicated data transferred to the second hardware system, to hosted data on the second hardware system. The hosted data may be stored on the second hardware system. The present duplicated data may be the current data for the server system.

More preferably, the hosted data on the second hardware system comprises data previously duplicated from the server system and transferred to the second hardware system. Still more preferably, the step of comparing comprises determining the change between the present transferred data and the previously transferred data. Thus present and previous data may be compared, rather than merely present data with some other hosted data.

In an embodiment, the step of duplicating data from the server system comprises duplicating all contents of a dataset of the server system, and the step of comparing comprises determining the change between the present transferred dataset, and the previously transferred dataset.

Such contents of the dataset may be the entire, total, or complete contents of the dataset. The dataset may comprise the entire data contents of the server or database system, and therefore the entire contents of the server/database system are duplicated. Alternatively, it may be that the dataset is a subset of the data on the server/database system. The dataset may also be the entire contents of one data or database subsystem of the overall system, such as one server of a distributed system of servers.

Suitably, the step of duplicating data from the server system comprises duplicating data from the same dataset as for a previous duplication, and the step of comparing comprises determining the change between the present duplicate of the dataset, and the previous duplicate of the dataset.

Thus the previous duplicated data may be from the same data source, data set, part of the database or the like as the current or present duplicated data. This allows comparison of the previous version of some data with the current version of that data.

In an embodiment, the step of duplicating data from the server system comprises: obtaining all data contents, for a first time point, of a dataset of the server system; and obtaining all data contents, for a second time point, of the dataset of the server system, and wherein the step of processing the data comprises: comparing the first time point contents of the dataset with the second time point contents of the dataset; and using the comparison to determine a change for the server system between the first and second time points.

Features of this kind allow advantages of the disclosure such as providing a comprehensive or fail-safe monitoring system, in which the entire contents of a dataset are compared to previous (entire) contents of the dataset, so that any change whatsoever will be detected, whether or not a specific type or location of change is being sought.

Suitably, the method comprises, following the step of processing the data on the second hardware system to determine a change for the server system: generating for storage on the second hardware system a record of the change determined.

This allows for only the change determined to be stored, and for redundant data to be deleted. This therefore allows for consolidation, de-cluttering of the monitoring storage, and potentially frees up that resource for other uses in the second hardware system. The method of this embodiment can therefore at any given time, store one or more recorded changes (determined by comparison between subsequent data), alongside the present data ready for comparison with the next data received.

In an embodiment, the method may comprise, following determining the changes, discarding the present duplicate of the dataset. In alternatives, the step of comparing may comprise determining changes between a present duplicate of the dataset and a previous record of changes determined for the dataset.

Suitably, the method comprises: storing a record of the current determined change; comparing the current determined change to a stored record of a previously determined change for the server system; and using the comparison to evaluate the current change for the server system.

This allows for prioritisation and categorisation of changes determined, and also for monitoring of the historical progression of changes of given types or locations.

In embodiments, the server system is a database system, and comprises: a database; and a database management system. The database and/or management system may comprise a database schema, a database administrator or the like.

Suitably, the data duplicated from the server system comprises data relating to one or more of: data objects; schema; size; status; access history; synchronisation; replication; operating system; and management parameters of a database of the server system. In embodiments, the step of processing the data to determine a change may comprise comparing data relating to one or more of these.

For example, the data duplicated may relate to a change in status of the system, from a normal running mode to an error mode. The processing may therefore determine the change between these modes from the data duplicated from the database. In another example, the processing may find a change in a data object, such as an edited object in a relational table database.

One embodiment of a second aspect of the disclosure can provide a system for monitoring changes for a server system, comprising: a first hardware system on which the server system is operated, comprising a module configured to duplicate data from the server system; a second hardware system separate from the first hardware system, comprising at least one processor; and a transmission device configured to transfer the data duplicated from the server system from the first hardware system on which the server system is operated, to the second hardware system, wherein the processor of the second hardware system is configured to process the transferred data to determine a change for the server system.

One embodiment of a third aspect of the disclosure can provide a monitoring system for monitoring changes for a server system operated on a separate server hardware system, the server hardware system comprising a module configured to duplicate data from the server system, the monitoring system comprising: at least one processor; and a receiver device configured to receive, from the server hardware system on which the server system is operated, data duplicated from the server system by the module of the server hardware system, and transferred to the monitoring system, wherein the processor of the monitoring system is configured to process the transferred data to determine a change for the server system.

The second hardware system may comprise a monitoring server system, and the first hardware system may comprise a server, such as a database server. The (database) servers may therefore be the clients of the monitoring server system, and the (database) servers may serve data source clients, providing database services for those clients. The hardware systems may be single or distributed systems, or components of such systems.

Further aspects of the disclosure comprise computer program applications, or computer readable media comprising computer program code, adapted, when loaded into or run on a computer or processor, to cause the computer or processor to carry out a method according to any of the aspects and embodiments described above.

The above aspects and embodiments may be combined to provide further aspects and embodiments of the disclosure.

Processors and/or controllers may comprise one or more computational processors, and/or control elements having one or more electronic processors. Uses of the term "processor" or "controller" herein should therefore be considered to refer either to a single processor, controller or control element, or to pluralities of the same; which pluralities may operate in concert to provide the functions described. Furthermore, individual and/or separate functions of the processor(s) or controller(s) may be hosted by or undertaken in different control units, processors or controllers.

To configure a processor or controller, a suitable set of instructions may be provided which, when executed, cause said control unit or computational device to implement the techniques specified herein. The set of instructions may suitably be embedded in said one or more electronic processors. Alternatively, the set of instructions may be provided as software to be executed on said computational device.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The disclosure will now be described by way of example with reference to the accompanying drawings, in which.

Corresponding reference numerals indicate corresponding parts throughout the several views of the drawings.

DETAILED DESCRIPTION

Figure 1:
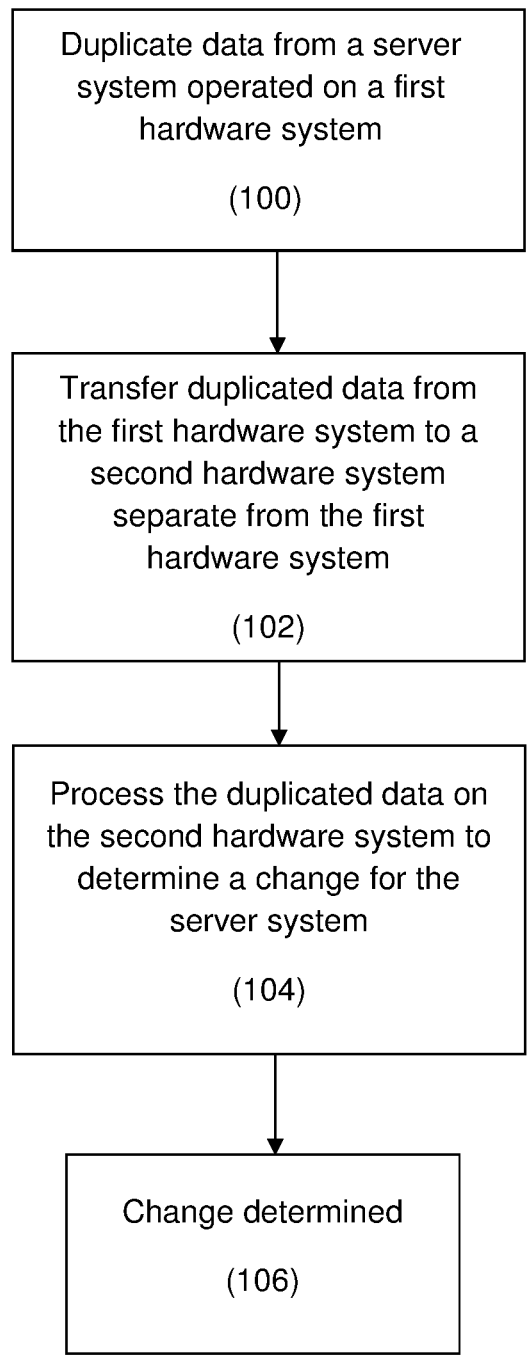
FIG. 1 is a diagram illustrating steps of a method according to an embodiment of the disclosure.

Embodiments of the present disclosure will be described, by way of example only, with reference to the drawings. The description and specific examples included herein are intended for purposes of illustration only and are not intended to limit the scope of the present disclosure.

Embodiments of the disclosure provide systems and methods for monitoring servers and/or databases, to monitor changes in the databases (or data on the servers) in ways which do not interfere with the data areas/databases themselves. For example, data may be duplicated from a server and passed to a separate hardware system from that running the server; processing for monitoring can then be done on this duplicated and removed data, in order to avoid disturbance of and maintain peak performance of the server.

Embodiments of the disclosure are applicable to databases and database systems, but also to server systems which may not necessarily be designated as database servers, but nevertheless store data, the management of which may require monitoring.

Embodiments of the disclosure are server/database (DB) monitoring tools which will, for example, alert a user or other system when changes are made to a database, for instance to a schema within an object-relational database or database management system. The tools can accommodate the necessity for change control and schema change integrity within database administration.

There are previously considered monitoring tools, though none that encompass the various levels of monitoring/alerting that embodiments of the disclosure offer and none that store the data in a centralised 'hub' away from all monitored systems.

Distribution of database systems (only) is known to the art; embodiments of the disclosure however provide distribution of duplicate data or database information, which is then monitored.

The monitoring tool itself can reside within the hub monitoring system, and all functionality (comparing, storing results, etc.) can happen within the hub. There may also be provided a GUI frontend dashboard to view the reports/alerts/tool administration and configuration, along with email based alerting.

The tool can monitor/alert on any structured IT infrastructure system, such as a database management system, or OS server (Linux, windows, MAC OS, etc.). Data being collected is regarding the current state of the structure within the monitored infrastructure, a "snapshot" of a given point in time. The tool itself can be designated a database- or server-centric comparison engine, which pulls data from various structured IT infrastructure.

Embodiments of the disclosure can provide a monitoring application which is 'always on'. In embodiments, the system can be self-maintained, for example:

in terms of growth (the application can delete redundant data and utilise reclaimed space to reduce costs of running the application);

in terms of performance (all comparisons and checks are done on the centralised hub, away from any server or database, which ensures the system does not impact monitored DBs);

in terms of monitoring/alerting (checks can be scheduled and alerts automated, which removes the need for manual efforts to maintain the application).

Methods and systems of embodiments of the disclosure differ from mere simple hub and spoke systems, in that these have not been previously applied to database or server systems, and in that no such system has duplicated the data from the system to transfer it to a hub, for processing/monitoring. Indeed, for previous systems there would be no incentive to duplicate all of or large sections of a database. Previous monitoring systems are typically locally monitored and process data for monitoring on the server or database system itself. In contrast, the present system does duplicate all or large sections of the data, in order to remove all monitoring processing from the location of the database.

By moving all processing of the data (comparisons/identifying differences) away from the monitored database/server and onto a centralised hub, systems of embodiments of the disclosure can better afford to run more complex and comprehensive scans, for example using duplication of entire data sets, which previously considered tools may have been considered inefficient or performance impacting.

These methods and systems also differ from previous systems in that the first step is to duplicate data from the monitored system, and then to look for changes; in contrast to previous systems first attempts to detect changes directly, usually locally.

Embodiments of the disclosure promote proactive monitoring rather than passive monitoring; since potentially the entire database/dataset is duplicated regularly and monitored for changes, all possible changes should be noted. This information can therefore be used to better control the monitoring process.

One previously considered monitoring system may monitor a change in the current status of a process of a pre-defined rule, for example, the status of a database changing from open to closed, which may prompt an alert. Embodiments of the disclosure in contrast provide comparison of changes which can allow different types of monitoring analysis to be performed, such as tracking the progress of changes to a database, or monitoring the frequency of changes. The systems of embodiments are therefore aware of how an environment has looked/changed in the past, and can alert on changes that previously considered monitoring tools would not have considered an event.

Embodiments of the disclosure can provide the following benefits:

Reduce risk of database administration (DBA) errors and/or issues caused by erroneous schema changes;

Identify invalid DB objects and when objects became invalid;

Provide historical reports on all changes;

Provide database capacity planning via database space usage reports;

Ensure DBA standards are being adhered to in all environments;

Ensure security and compliance standards are being adhered to in all environments.

Another feature provided by embodiments of the disclosure is the ability to ensure all environments of a system are identical or meet requirements. For example, the tool can monitor/alert if a production environment is not identical to pre-production/lower environments.

In addition, in embodiments, the more these systems are used, the more efficient they become. Rules and comparisons can be based on collected data so the more data that is available, the more accurate the results will be. Each tool in the suite can also utilise data collected from other tools. Using the application as an entire suite increases the accuracy, performance and intelligence of the individual tools.

FIG. 1 is a diagram illustrating steps of a method according to an embodiment of the disclosure. First, data is duplicated (100) from a server or database operated on a first hardware system. The duplicated data is then transferred (102) from the first hardware system to a second hardware system separate from the first hardware system. The duplicate data is then processed (104) on the second hardware system to determine a change (106) for or in the server system.

The data housed in the data area or database can be any type of data suitable for a database or monitorable dataset. The data addressed by the monitoring system (i.e. that duplicated from the server system) can be any data from the server or database itself, or from the database management system. For example, the data may be data objects in or from the database itself; a data item in the database may be altered. It may be data from or relating to the database schema, such as parameters governing the structure or functionality of the database; for example, an integrity constraint may be changed. It may be the size of the database or data area of the server; a number of objects, size of a matrix or table of values may have been altered, for example by adding a column to a table. It may be a status of the server or database; for example, toggle data noting that the database is running, or down; data noting that given software is installed/running. It may relate to access history; data logs showing which users have accessed the server or database will change with new access instances. It may relate to synchronisation or replication of the database; data denoting when or whether these have occurred recently, or indicating degrees of success. It may relate to the operating system in use. The data may also be or relate to management parameters of the database management system; for example, records of events, actions taken during management, or changes in management systems.

The first hardware system may be any such system capable of storing a database or data-storing server software, or behaving as a server. The transfer of the data duplicated from the system, to the second hardware system can be implemented depending on the nature of the separation of the first and second hardware systems. These may simply be physically separated, though connected by wiring or a bus, for example in a simple system containing two hardware subsystems. The transfer can then simply be made along the bus. In a client-server type system, where the monitoring system is a server for the database clients, the transfer may be over a network.

In embodiments, the transfer of the data to the hub is in fact the duplication of the data, i.e. transfer is implemented by copying of the client data to the hub. In certain embodiments, if a transfer fails, the tool can prompt an alert and a scan will not be run for that day. If the issue is not fixed on that day, the tool can continue with the next scheduled transfer of the data.

The processing for determining the change will be described in more detail below with reference to FIG. 5.

In an embodiment, all tools in the monitoring suite identify changes/differences using a 'scan' approach. A scan takes a snapshot of an environment at a given time. Comparing the current scan with the last scan can identify any differences in that time period.

In embodiments, the comparison engine may take the following steps:

i. during a 'scan' of a monitored system or infrastructure, data is pulled into a centralized hub by various techniques, depending on what type of infrastructure is being monitored;

ii. the data is then stored in database tables within the hub. The data is labelled with a unique identifier and is also assigned metadata such as a timestamp, a scan run number, a name/description of monitored infrastructure;

iii. on the next scan, the same procedure is followed. Data is pulled, stored and labelled with an identifier and metadata;

iv. the comparison tool initiates and looks for differences between the two scan datasets;

v. results of the scan are then stored in result tables;

vi. result data is also assigned metadata, including:
date;
was there actually any difference at all (which will determine if alerts are sent or not sent);
the severity of the difference—based on pre-defined thresholds of severity, the amount of difference(s) will determine the type/priority of alert sent.

vii. result data can now be used for:
alerting on changes in a system or infrastructure;
reporting on changes within a period of time, building a timeline of changes;
identifying trends/patterns within an infrastructure based on the changes happening over a time period;
future planning of infrastructure based on reporting data;
redesigning/improving infrastructure.

For example, with an embodiment in which a database schema is being monitored:

Day 1: a scan is run which captures a snapshot of a specific schema

Day 2: changes are made to a table in the schema

Day 2: a scan is run which captures a new snapshot of the schema. Comparison is made between Scan1 and Scan2 and the table change is identified and alerted as a change.

In embodiments, the system can work on a 'hub and spoke' model. The application monitoring the system runs on a centralised hub and monitors multiple client server or DB environments by pulling the relevant data from each client into the hub and running comparisons on the hub.

Figure 2:
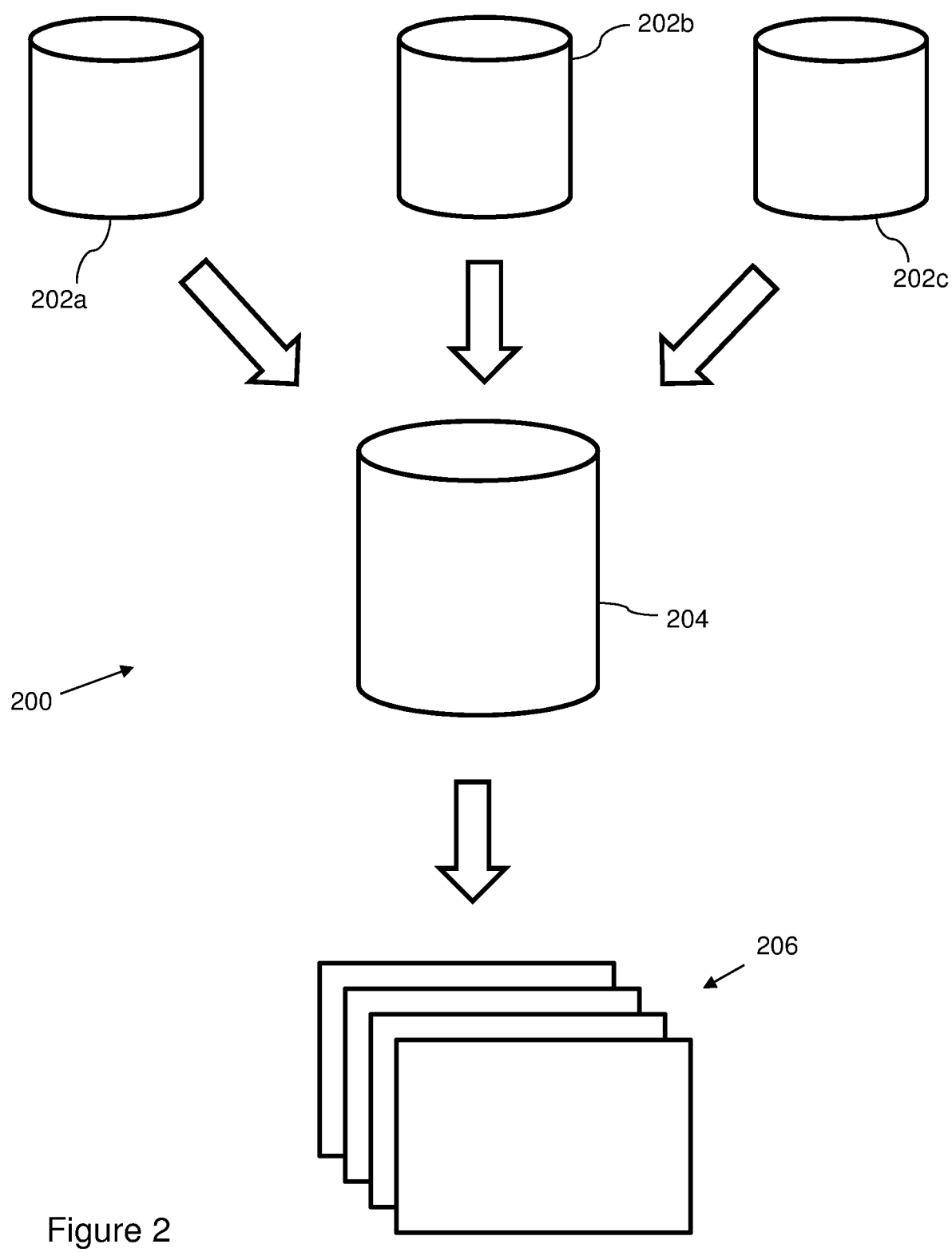
FIG. 2 is a schematic diagram illustrating a monitoring system according to an embodiment of the disclosure.

FIG. 2 is a schematic diagram illustrating a monitoring system according to an embodiment of the disclosure. The monitoring system (200) is comprised of the plurality of server systems 202a, 202b, 202c and the single monitoring system 204. Data can be drawn from the servers by the central monitoring system, as indicated by the arrows. The processing is then carried out on the monitoring system. The monitoring system, having determined changes in the servers can output reports or alerts 206 based on the determined changes. For example, a report could list the historical changes for a given database, for a certain dataset. An alert could be sent to a user or another system, when a change detected is particularly significant, such as a large change to a dataset/database, or a change in a database which is not frequently accessed.

Figure 3:
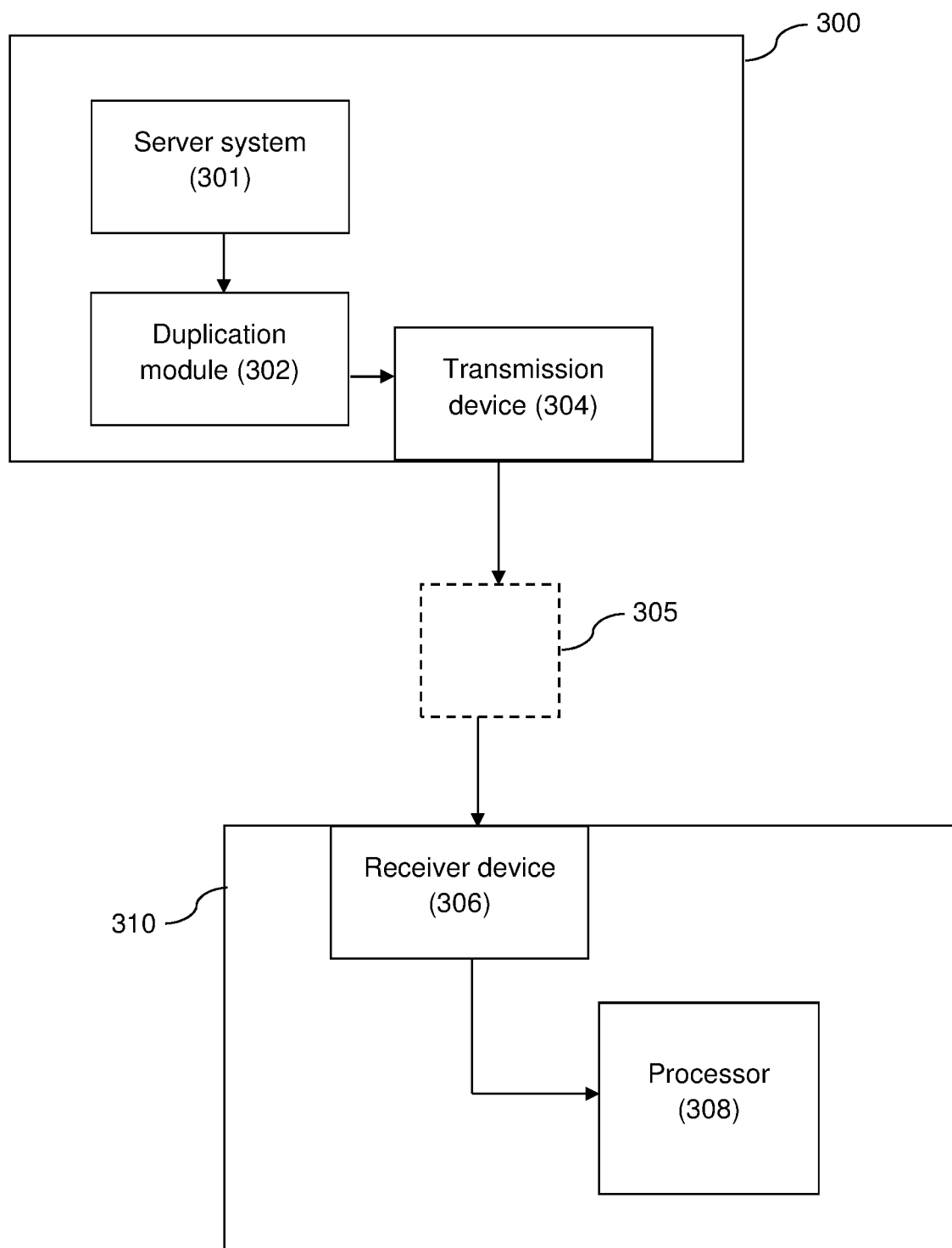
FIG. 3 is a diagram illustrating components of a monitoring system according to an embodiment of the disclosure.

FIG. 3 is a diagram illustrating components of a monitoring system according to an embodiment of the disclosure. The first hardware system 300 houses the server system 301, a duplication module 302 and a transmission device 304. Data can be pulled from the system and duplicated by the duplication module, and then transferred elsewhere by the transmission device. The medium by which the transfer takes place is indicated at box 305; this may be a network, which communications devices on the first and second hardware systems communicate with. It may simply be that the two systems are directly connected.

The second hardware system 310 houses a receiver device 306 and a processor 308. The receiver receives the transferred duplicated data from the first hardware system, and passes it to the processor. The processor undertakes tasks such as processing the data to determine changes.

Figure 4:
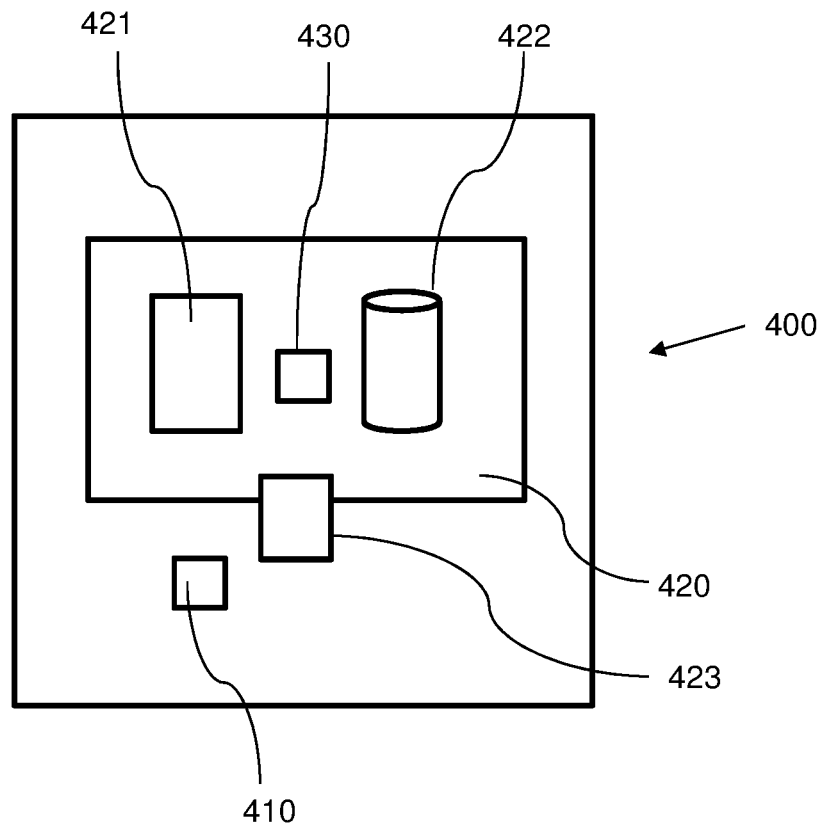
FIG. 4 is a diagram illustrating components of a server system according to an embodiment of the disclosure.

FIG. 4 is a diagram illustrating the components, structure and functionality of a server system 400 according to an embodiment of the disclosure, which can provide the features of the monitoring server 204 shown in FIG. 2, for example processing the data to determine changes in the monitored system(s). Note that a server such as this could also provide the functionality for a server system such as those shown in FIG. 2 (server system 202a, 202b, 202c).

The server comprises a processing environment 420 with processor 421 and memory 422, with associated communications functionality 423. The communications functionality may include a networking capability allowing communication with a network, or directly with another server or computer device, such as a monitoring server 204 or a server or database system 202a, 202b, 202c. This communication may be secured. The memory 422 may store readable instructions to instruct the processor to perform the functions of the monitoring system. The processor 421 is a representation of processing capability and may in practice be provided by several processors. A database 410 is provided, storing data as applicable. For the monitoring server 204, this database can provide the storage for previous data transferred from the databases, for records of previous changes, and the like. Elements shown within the processing environment 420 use the processor 421 and the memory 422 to deliver functionality; for example, these elements can provide steps of embodiments of the disclosure such as processing the duplicated data on the monitoring system to determine a change for the monitored system. A database management system 430 module can be located within the processing environment 420, to provide the management functions for a database. The database management system may also comprise functions of other parts of the server, such as the processor 421, the memory 422 and the database 410 itself.

The computing devices noted above with reference to FIGS. 3 and 4 may include one or more of logic arrays, memories, analogue circuits, digital circuits, software, firmware and processors. The hardware and firmware components of the computing devices may include various specialized units, circuits, software and interfaces for providing the functionality and features described herein. The processor(s) may be or include one or more microprocessors, application specific integrated circuits (ASICs), programmable logic devices (PLDs) and programmable logic arrays (PLAs).

Figure 5:
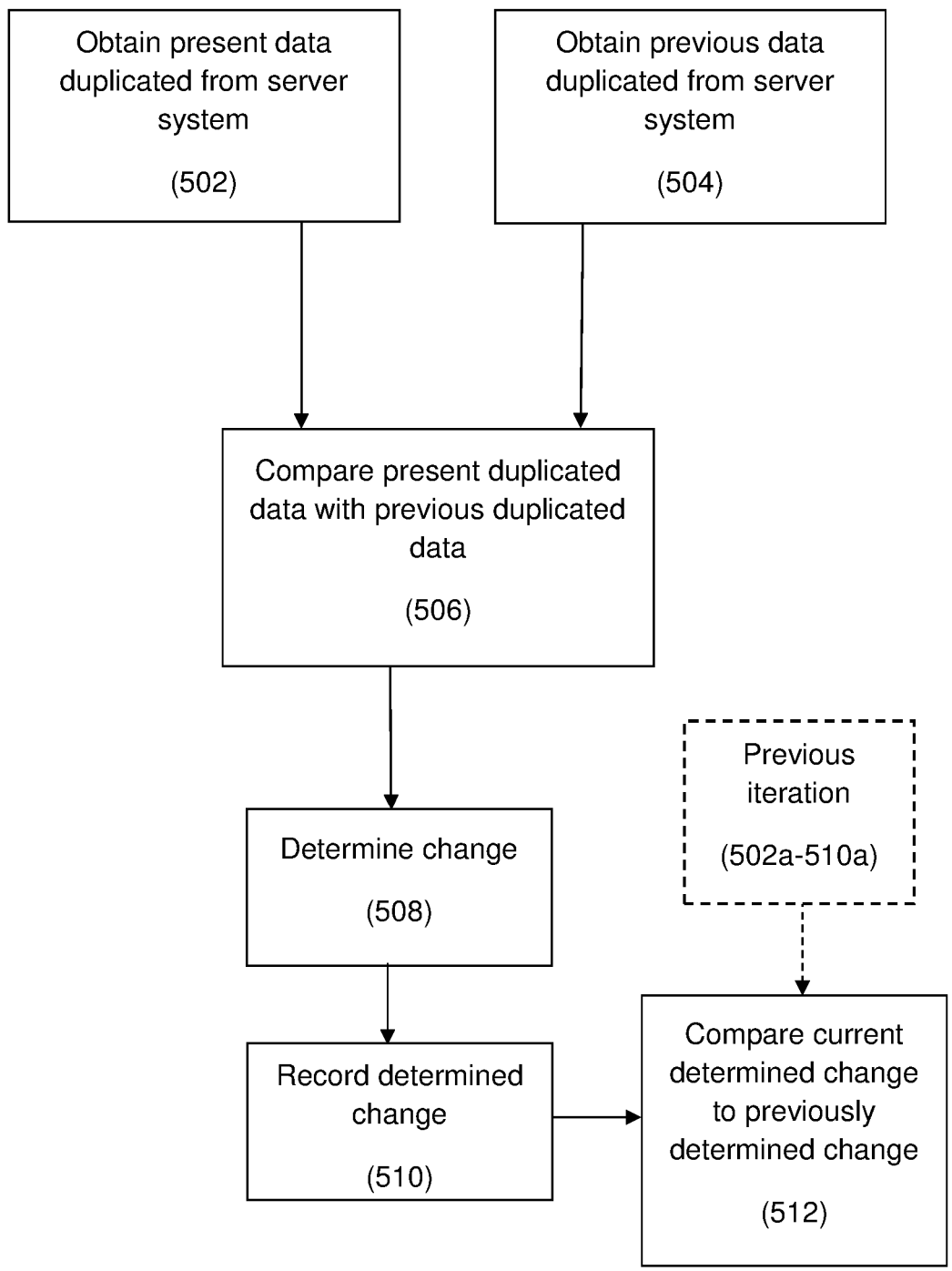
FIG. 5 is a diagram illustrating steps of a method according to an embodiment of the disclosure.

FIG. 5 is a diagram illustrating steps of a method according to an embodiment of the disclosure.

In a typical monitoring scheme using embodiments of the disclosure, duplicated data from the server or database system is continually being transferred, for example at scheduled times, to the separate hardware system so that the data and the subsequent additions and updates to that data can be processed to find changes to the server/database.

In the embodiment shown in FIG. 5, following (at least two) of the duplication and transfer steps (for example those illustrated in FIG. 1), a present or current set of data is obtained (at 502), for example from hub system 204 illustrated in FIG. 2. A previous set of data duplicated from the database or server is also obtained (at 504). The previous set of data is usually from the same dataset of the database/server as the present data, for example a previous full content download of that dataset to compare to the current full content download.

There are cases in which the dataset for the (present) data may be different from that for the data to which it is compared in processing; for example, present data indicating a user access may be compared with previous user accesses, but may also be compared with other audit data or DBMS data concerning access rights.

Following obtaining the present and previous data, these are compared (at 506), and any change between the data is determined (at 508). The change determined is then recorded (at 510). For example, if a new version of a data object contains new data, the new parts of the data are stripped out and recorded; thus the whole dataset need not be stored, merely the differences from the previous version. For instance, a data object may contain additional information in an additional column added in the latest version; only this additional column is stored.

In a further step, the change itself, i.e. the difference between the present and previous data which has been recorded (at 510), is compared to a previous such determined change (at 512). For example, if a data object has been changed twice, a comparison of present/previous at a first time point will have picked up the first change (e.g., add a column), and a comparison of present/previous at a second time point will have picked up the second change (e.g., add a further column). A previous iteration (at 502a-510a) of the steps outlined above will have provided the previous determined and recorded change.

Such comparison can allow different types of monitoring analysis to be performed, such as tracking the progress of changes to a database, or monitoring the frequency of changes. This can allow the monitoring system to become more familiar with the database and its changes as the monitoring progresses, and can allow prioritising and categorisation of changes.

In an embodiment, combining the current full duplicated dataset and the previously stored detected changes, can be used to create a timeline report showing all changes of the environment from the current point in time to the first day of monitoring.

A specific embodiment of the disclosure can be described as follows, in relation to a database (server) system. The system works by querying database views for all objects and inserts the data into a centralized repository for comparison.

1. A package queries the database object views on each client database and inserts them into the repository via a DB link.
2. The repository contains tables which will hold the data in batch format from the Client DBs:
   i. The first run will contain all the schema objects as batch ID 1;
   ii. The second run will hold all the schema objects as batch ID 2.
3. There is a comparison package in the repository which will query the tables:
   i. The comparison looks for differences between the last batch of inserted data and the second to last batch.
4. Any differences in the schemas between the two batches will be written to a report and emailed;
   i. the system will use scheduling and alerting facilities in order run the reports.

The differences can also be stored, and batch ID 1 can be deleted, though batch ID 2 will usually be maintained for comparison with the next scan run.

In embodiments, the hub monitoring system can be a centralised repository for all monitored environments within an organisation. All data is kept in the central hub and can be used, for example, for company-wide reporting. For instance, a report can be run to show the percentage of all environments in the company that adhere to company standards.

Embodiments of the disclosure can use features such as those described above to provide a suite of tools, each with their own specific role in monitoring specific areas of a database infrastructure. Examples are:

Schema—monitoring any changes to objects (tables, indexes, etc.) in a schema and alerting the relevant user, device, system, or networked device when changes occur.

Capacity—tracking database growth and displaying growth patterns in a graphical format.

Scan—showing differences between multiple databases, including DB configuration settings, sizes, parameters, and the like. Useful for comparing different environments of one DB (test vs. production).

Audit—monitoring database user access that does not adhere to audit standards (e.g., alert on developers who wrongfully have admin privileges).

Data—monitoring tool that ensures replicated databases are in sync and will alert when there are differences in data between replicated DBs.

Server—alerting on changes to OS level of a database server. Changes in memory parameters, configuration, software, directories, permissions.

Infra—reporting on all software currently installed on a server.

Backups checking and reporting on database backups. Replication—checking replication procedures.

Standard—checking that all DBs are in the appropriate directory, and that servers are on the appropriate port, for example.

For example, Audit is a monitoring tool that checks the DB user permissions which have been added or deleted from day to day. This program also checks changes in the status of a request from implemented, pending or emergency implementation.

Audit operates on the client to hub model of the monitoring system, in which an identity checking application takes the form of the client. Requests for access are made through the identity checking application and are sent from the client to the hub, as part of the regular duplicate data, transfer to hub procedures as described above with basic embodiments of the disclosure. At the hub, procedures are run against the data. Finally results are sent via email from the hub to a destination, for example an administrator checking access permissions.

The procedures run on the hub compare current data against previous scans, and isolate new data. Any new data i.e.: new requests, are stored in a scan results table. These new requests are the details reported by email to the relevant party.

For example, Audit can check for any accesses of the database that do not have records in an identity check application (by detecting the changes in the access record between versions of the dataset), or prompt an alert on any access which has no request whatsoever.

In an embodiment, the audit reports can be filtered after the initial step of comparing the data with previous data to find differences. For example, a filter can remove access requests for employees that have DBA roles. These requests will be noted and added to the results table but will not be sent through the email system. This ensures only employees that are not entitled to access will have their request flagged.

As with other embodiments above, where data is no longer needed after compare procedures have been run, this can be removed to conserve space. The initial scan may need to be retained permanently; the current and previous scans are needed to run procedures but will be removed as needed.

Another example is the Schema tool, the purpose of which is to monitor any changes to a single database from day to day.

The following objects are monitored:
Tables
New or deleted tables
Table column definitions
Indexes
Status
Uniqueness
Indexed Columns
Procedures
New or deleted
Constraints
New or deleted
Constraint Type
Constraint Columns
Triggers
New or deleted
Status
Views
Table Partitions
Index Partitions The monitoring system of embodiments of the disclosure can also provide an overview of all monitoring tools, for example a dashboard application reflecting the results of the tasks the tools implement. This will contain the specified information from the particular scans that are needed for monitoring.

The dashboard itself will dynamically display key information in a variety of pages, depending on which scan tools are being/will be utilised.

It will be appreciated by those skilled in the art that the disclosure has been described by way of example only, and that a variety of alternative approaches may be adopted without departing from the scope of the disclosure, as defined by the appended claims.

With that said, and as described, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of monitoring changes for a server system, wherein the server system is operated on a first hardware system, the method comprising:

duplicating, at a first hardware system, contents from a dataset of the first hardware system, at each of multiple time intervals, the contents of the dataset including all contents of the dataset, wherein the duplicated contents include first duplicated contents at a first one of the multiple time intervals, second duplicated contents at a second one of the multiple time intervals, and third duplicated contents at a third one of the time intervals;

transferring, by the first hardware system, the duplicated contents of the dataset to a second hardware system separate from the first hardware system;

comparing, by the second hardware system, the second duplicated contents of the dataset to hosted data on the second hardware system, wherein the hosted data includes the first duplicated contents transferred to the second hardware system;

determining, based on the comparison, by the second hardware server, a first change for the dataset;

storing, by the second hardware system, the first determined change in memory;

deleting, by the second hardware system, the second duplicated contents of the dataset;

comparing, by the second hardware system, the third duplicated contents of the dataset to the hosted data and the first determined change;

determining, based on the comparison, by the second hardware server, a second change for the dataset; and storing, by the second hardware system, the second determined change in the memory.

2. The method according to claim 1, wherein storing the first determined change includes generating for storage on the second hardware system a record of the first determined change.

3. The method according to claim 1, wherein the first hardware system is a database system, and comprises: a database consisting of the dataset; and a database management system.

4. The method according to claim 1, wherein the duplicated contents comprise data relating to one or more of: data objects; schema; size; status; access history; synchronisation; replication; operating system; and/or management parameters of a database of the server system.

5. The method according to claim 1, further comprising generating an alert based on the first and/or second change (s).

6. The method according to claim 1, further comprising monitoring a frequency of the first and/or second change(s).

7. The method according to claim 1, further comprising tracking a progress of the first and/or second change(s).

8. The method according to claim 1, further comprising graphically displaying the first and second changes relative to the first and second ones of the time intervals.

9. A monitoring system for monitoring changes for a first server hardware system by a second server hardware system separate from the first server hardware system, the first server hardware system configured to duplicate contents of a dataset within the first server hardware system, the contents of the dataset including all contents of the dataset, the second server hardware system comprising:

at least one processor; and a receiver device configured to receive, from the first server hardware system, the contents of the dataset duplicated by the first server hardware system;

wherein the at least one processor of the second server hardware system is configured to:
- compare a second, next one of the duplicated contents of the dataset to hosted data on the second server hardware system, wherein the hosted data includes initial contents of the dataset duplicated by the first server hardware system and a change between the initial contents of the dataset and a first, next one of the duplicated contents of the dataset transferred, by the first server hardware system, to the second server hardware system;
- determine, based on the comparison, and store a further change for the first server hardware system in the second server hardware system; and
- delete the second, next one of the duplicated contents of the dataset after determining and storing the further change.

10. The system of claim 9, wherein the second, next one of the duplicated contents comprise data relating to one or more of: data objects; schema; size; status; access history; synchronisation; replication; operating system; and/or management parameters of a database of the server system.

11. The system of claim 9, wherein the at least one processor of the second server hardware system is further configured to determine the change between the initial contents of the dataset and the first, next one of the duplicated contents of the dataset transferred, by the first server hardware system, to the second server hardware system.

* * * * *